April 18, 1950     F. M. BALDWIN     2,504,374
CONTINUOUS FLOW NUT CRACKING APPARATUS
Filed Aug. 25, 1945     2 Sheets-Sheet 1
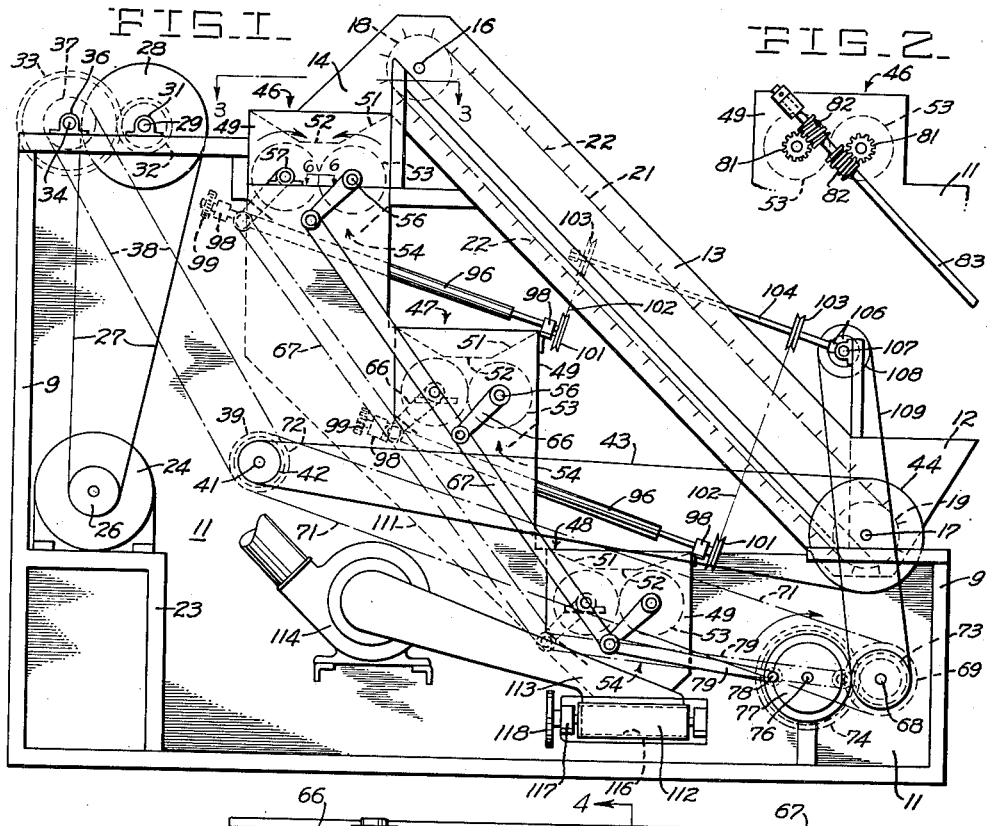
INVENTOR.
FREDERICK M. BALDWIN
BY Gardner & Warren
HIS ATTORNEYS.

April 18, 1950 F. M. BALDWIN 2,504,374
CONTINUOUS FLOW NUT CRACKING APPARATUS
Filed Aug. 25, 1945 2 Sheets-Sheet 2
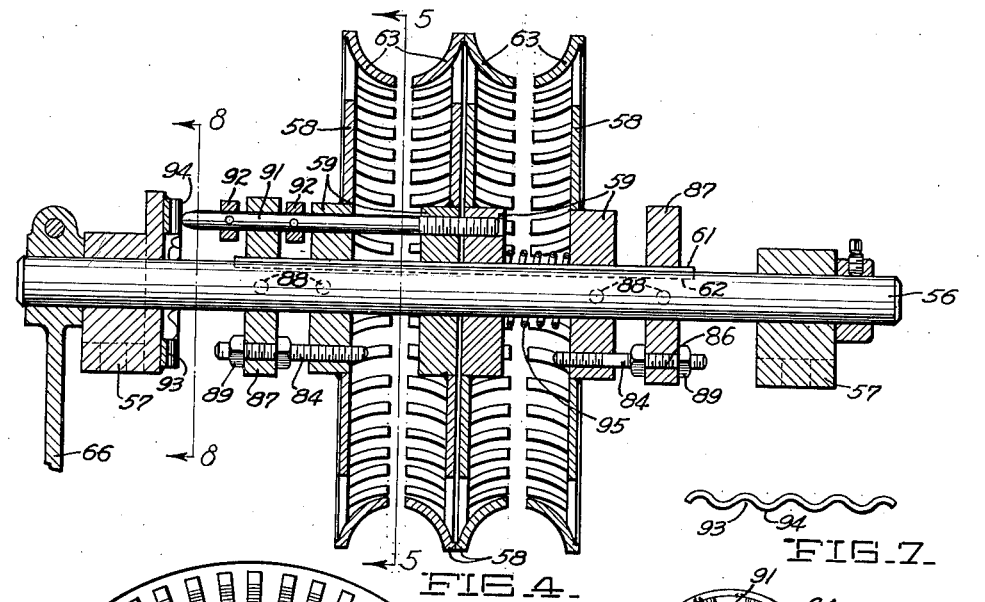
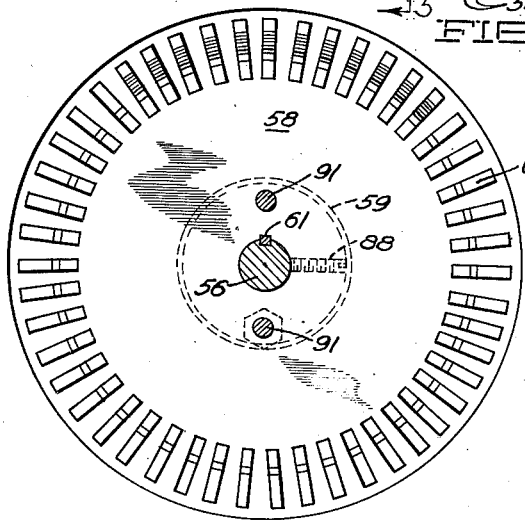
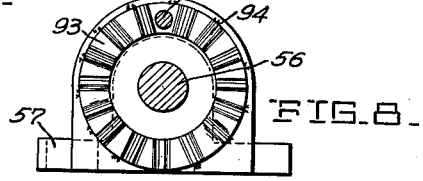
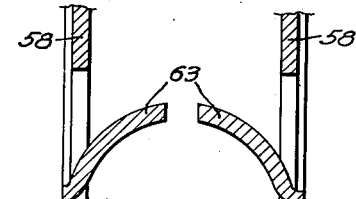
INVENTOR.
FREDERICK M. BALDWIN
BY
Gardner & Warren
HIS ATTORNEYS.

Patented Apr. 18, 1950

2,504,374

UNITED STATES PATENT OFFICE 2,504,374

CONTINUOUS FLOW NUT CRACKING APPARATUS

Frederick M. Baldwin, San Francisco, Calif.

Application August 25, 1945, Serial No. 612,632

4 Claims. (Cl. 146—11)

This invention relates to mechanism for cracking the shells of nuts so as to effect separation of the nut meat from the shells.

An object of the invention is to provide mechanism of the character described which is adapted to operate upon and efficiently crack ungraded nuts embracing a wide range of sizes.

Another object of the invention is to provide apparatus of the nature referred to which effects a considerable increase in the output of large-size nut meat pieces and consequently lessens the percentage of minced meat which has very low commercial value.

A further object of the invention is to provide nut shelling apparatus which is capable of handling an increased volume of nuts due to the high speed operational features incorporated in the mechanism.

Still another object of the invention is to provide, in a nut shelling apparatus, resilient shell cracking elements which produce a gentle but positive crushing strain on the shells without materially damaging the nut meat.

Yet another object of the invention is to provide, in a nut shelling apparatus, means for simultaneously and independently imposing crushing pressure on the nut in a plurality of unrelated planes so as to effect a thorough cracking of the shell in order to more readily facilitate its separation from the nut meat.

A still further object of the invention is to provide a combined nut grader and shelling apparatus.

Other objects and features of value will become apparent as the detailed description of the invention, hereunto annexed, proceeds. It is to be understood that the invention is not to be limited to the specific form thereof herein shown and described as various other embodiments thereof may be employed within the scope of the appended claims.

Referring to the drawings:

Figure 1 is a side elevational view of the nut shelling apparatus of my invention.

Figure 2 is a fragmental side elevational view showing a modified form of drive for the rotors.

Figure 3 is a top plan view, to an enlarged scale, of a set of rotors and its associated screening and transfer rollers.

Figure 4 is a vertical sectional view of the rotor structure, the plane of section being indicated by the line 4—4 of Figure 3.

Figure 5 is a vertical sectional view showing the operational face of one of the rotor disks. The plane in which the view is taken is indicated by the line 5—5 of Figure 4.

Figure 6 is a fragmental horizontal sectional view, to an enlarged scale, showing the relationship between opposed pairs of rotor disks in a set thereof. The plane in which the view is taken is indicated by the line 6—6 of Figure 1.

Figure 7 is a top plan view of the rotor disk oscillator cam.

Figure 8 is a vertical sectional view showing the cam of Figure 7 in its operational position. The plane in which the view is taken is indicated by the line 8—8 of Figure 4.

In a previous type of nut shelling machine, the nuts were fed between a pair of tangentially disposed semi-circular rotors each of which was provided with a peripheral groove so as to form between the rotors, in their mutual plane of tangency, a cylindrical passage through which the nuts were forced by oscillating motion imparted to the rotors thereby effecting sufficient cracking of the shells to permit separation of the latter from the nut meat. Obviously, since the rotors were rigid only nuts which were slightly larger than the aforesaid cylindrical passage would be cracked upon being passed between the rotors while those which were smaller or materially larger would either drop freely through the passage or would be crushed so severely that the nut meat was rendered commercially undesirable. Furthermore, after being in use for some time, the rotor grooves would become coated with nut oil from the crushed meats, which would reduce the frictional grip on the nut shells thereby causing slippage which materially reduced the output of the machine. In addition, since the rotors were adjusted to operate only on a certain size of nut it was necessary to either grade the nuts into batches of the various sizes and to run each batch independently through the machine, with compensating adjustments of the rotors between runs, or to provide a plurality of machines each fixedly adjusted to accept only a prescribed size of nut. Operating under normal conditions the above machine was capable of producing only about 48 per cent of half kernels, the remainder being divided about as follows: 18 per cent about one-fourth kernel, about 7 per cent smaller than one-fourth kernel, about 22 percent split in half but remaining in the shell and about 5 percent of small particles or minced meat. In addition to the cracked nuts there were always about 25 percent of uncracked nuts, mostly abnormally undersized, in the tailings that had to be gathered and re-run through the machine after properly adjusting the latter.

The apparatus of the present invention overcomes the undesirable features outlined above and vastly improves the quality of work done over the old type machine while greatly increasing the input capacity and product output of the mechanism. There is now no need for segregating the nuts into separate batches as the machine is capable of efficiently cracking all of the nuts within a comparatively wide range of normal sizes since one of the important operational characteristics of the machine is its capability of receiving a continuous flow of the ungraded nuts, selecting and cracking the larger of the nuts and passing the remainder on to successive stages of the mechanism wherein further selections of larger nuts are accomplished until substantially all of the nuts are cracked. The actual cracking of the nut shells is done by mechanism which is superior to the apparatus previously employed in that the resilient nature of the mechanism permits of a certain amount of leeway in the size of nut receivable by the mechanism and its improved design eliminates the above-mentioned undesirable fouling caused by the nut oil.

In greater detail, the apparatus comprises a suitable supporting structure having a framework 9 on which a pair of spaced parallel side plates 11 is secured. Mounted on what may aptly be termed the front of the machine is a continuous feed conveyor comprising a material-receiving hopper 12 formed integrally with and at the bottom of a trunk 13 rising angularly upwardly and rearwardly toward the top of the machine and terminating in a downwardly opening discharge port 14. Shafts 16 and 17, positioned respectively adjacent upper and lower ends of the trunk 13 and journaled in suitable bearings provided in the sides of the conveyor housing, carry sprockets 18 and 19 with which chains are engaged carrying an endless belt 21 fitted with cleats or plates 22. The arrangement of the parts is such that nuts deposited in the hopper 12 are engaged by the cleats or plates 22 and are carried upwardly through the trunk 13 to be discharged through the port 14. The elevation of the discharge port 14 of the conveyor is sufficient so that the subsequent flow of the nuts through the various units of the apparatus to be hereinafter described is accomplished by the force of gravity.

Means is provided for driving the conveyor just described. Suitably mounted on a supporting frame 23, secured to and forming part of the framework 9, is a motor 24 equipped with a pulley 26 driving, through a belt 27, a pulley 28 fixed on and for rotation with a shaft 29 journaled in suitable bearings 31 mounted at the top and to the rear of the framework. The shaft 29 carries a pinion 32 meshing with a gear 33, carried on a shaft 34 which is journaled in suitable bearings 36 also mounted on the framework, the shaft 34 being equipped with a pulley 37 which drives, through a belt 38 and pulley 39, a jack-shaft 41 journaled in bearings provided therefor in the side plates 11. A small pulley 42, engaged by an endless belt 43, drives a comparatively larger pulley 44 secured on the shaft 17 located at the lower end of the conveyor. The speed ratios between the various interconnected components of the drive is such that the most efficient linear speed is imparted to the conveyor so that the latter will neither feed material in overabundance, so that clogging of the machine will occur, nor at such a reduced rate that the output capabilities of the machine will be adversely affected.

Means are provided for selecting certain of the nuts discharged from the port 14 and for cracking the shells thereof. Disposed immediately below the discharge port is a plurality of cracker units generally designated by the numerals 46, 47, and 48. It may be stated here that although three units have been herein chosen as a means of explaining the invention and its mode of operation a larger or lesser number of the units may be employed depending upon the overall range of the relative sizes between the nuts to be operated upon. Each of the cracker units comprises an enclosed chamber 49 having an inlet hopper 51 formed in the top thereof which is provided with a central discharge aperture 52 disposed immediately above a pair of horizontally spaced cracker rotors, generally indicated by the numeral 53, the said aperture 52 being in vertical alignment with the plane of tangency between the rotors. Each of the chambers 49 is also provided in its bottom with a discharge opening 54.

Each of the cracker rotors, as is best shown in Figure 4 comprises a drive shaft 56 which is journaled in suitable bearings 57 carried by the side plates 11 or any other convenient portion of the apparatus framework 9. Mounted on the shaft 56 is a plurality, preferably four, of cracker disks 58 each of which is provided with a centrally bored hub 59 through which the shaft 56 passes, an elongated key 61 mounted in a keyway 62 on the shaft being provided which connects each of the disks 58 for rotation with the shaft. Each of the disks, as shown in Figures 4 and 5 is composed of light steel plate, a thickness of about three-sixteenths of an inch having been found to produce satisfactory results, and arranged in successive order about a circular path adjacent the periphery of each disk is a plurality of resilient fingers 63 each of which is formed by shearing narrow portions from the parent material of the disk. Each finger is shaped, as illustrated in Figure 6, to form, substantially, a quadrant of a circle designed to encompass the periphery of the chosen size of nut to be cracked. It may be stated here that each of the cracker units 46, 47 and 48 is designed to accommodate a certain range of nut sizes, the uppermost unit being capable of handling a limited group of larger nuts, the next lower unit handling nuts ranging smaller in size than the smallest nut of the preceding group, and so forth until the entire normal range of nut sizes is covered. The group of disks 58 on each shaft 56 is arranged in pairs, the disks of each pair being in confronting relationship, with the fingers 63 extending toward each other. This provides the effect of a semicircular peripheral groove in each pair of disks forming a rotor unit and, as will be seen in Figure 6, when two radially spaced rotors are positioned in tangential relationship, as occurs in each of the chambers 49, a circular orifice 64 is formed by fingers 63 of the respective disks, through which the nuts, dropping through the apertures 52 from the hopper 51 above are passed.

Means are provided for imparting to the respective shafts 56 a rotary motion so that as the nuts drop from the hoppers 51 into the rotor grooves, the larger of the nuts will be forced, by the tractive effort of the fingers 63 against the shells thereof, through the aperture 64 so as to effect rupturing of the shell. This particular pressure which is imposed in the direction of the rotor diameter may aptly be termed a radial rupturing pressure as distinguished from an axial rupturing pressure which will be presently described. There are two possible ways of effecting the drive for the rotors depending upon whether a reciprocating motion is desired or whether full and continued rotation of the rotors is to be provided. Each drive has its desirable features, the former perhaps being the most attractive due to its simplicity. However, the principal drawback associated with the reciprocating drive is the loss of productive flow in the machine during recovery movement of the rotors but this may be overcome to some extent by speeding up the machine. In detail, the reciprocating drive comprises levers 66 secured to each of the shafts 56, these levers being interconnected in separate groups by connecting rods 67 in order that the shafts so interconnected may be synchronously moved. A shaft 68, which is journaled in suitable bearings in the respective side plates 11, carries a pulley 69 connected by a belt 71 with a pulley 72 mounted on the jack-shaft 41 and also is provided with a pinion 73 which meshes with a gear 74 carried by a shaft 76 journaled in the manner of the shaft 68. The shaft 76 also carries, at its respective ends, disks 77 each of which is provided with a radially offset crank stud 78 which received one end of a link 79, the other end of the latter being pivotally connected with an end of the connecting rod 67. Energization of the drive apparatus above described will cause rotation of the disks 77 and a resulting reciprocation of the connecting rods 67 determined by the orbit diameter of the crank pins 78 thus rocking the rotors in successive reversals of rotary motion.

In Figure 2 is shown one method of effecting sustained unidirectional rotation of the rotors. In this modification, each of the shafts 56 is provided with work gears 81 which mesh with worms 82 carried by a drive shaft 83 which may be connected in a conventional manner with and to be driven by the motor 24. In this drive the worms 82 are, respectively, right and left hand as are their mating gears 81 so that relatively reversed rotational movement will obtain between the rotors of each cracker unit so that the nuts flowing out of the hoppers 51 will be tractionally drawn downwardly between the rotors and through the apertures 64 formed thereby.

When, in the course of the flow of nuts from the hoppers 51, a nut possessing a larger diametrical dimension than the size of the aperture 64 is encountered it will be pulled, due to the tractive effort of the fingers 63 against its shell, through the aperture thereby causing pressure to be exerted on the shell by the fingers 63 sufficient to rupture the shell. Conversely, nuts smaller than aperture 64 will pass therethrough without being subjected to any crushing strain. The above crushing stress since it is applied in a direction radially of the rotors may, for purposes of this description, be termed "radial stress" as distinguished from an "axial stress" also imposed on the nut in a manner to be explained presently.

Means are provided for adjustably varying the size of the aperture 64 so as to govern the minimum size of nut to be cracked by a particular cracking unit. In Figure 4 it will be noted that each of the rotor disks is capable of sliding motion axially of the shaft 56 and that the hubs 59 carry studs 84 which pass freely through aperture 86 formed in collars 87 which are fixedly secured to the shaft by pins or setscrews 88 or in any other suitable manner. Nuts 89, in threaded engagement with the studs 84 serve to secure the position of the disks 58 relative to the collars 87. Assuming, for purposes of description, that the positions of the two center disks of Figure 4 are fixed, it will be seen that the outer pair of disks may be independently and axially moved relative thereto so as to widen or constrict the widths of the peripheral grooves of the rotors as desired, the nuts 89 being thereafter tightened against the collars 87 so as to lock the outer disks in their adjusted positions. In addition, one of each pair of shafts 56 is adjustable toward or from the other of the shafts, this being accomplished by making one set of bearings 57 slideable in a manner well known in the art. The provision of these two adjustments permits the positioning of the fingers 63, as shown in Figure 6, at selected points along two angularly related lines of movement thus permitting enlargement or constriction of the aperture 64.

Means is provided for moving one disk of the rotor relative to the other disk thereof so as to successively compress and expand the peripheral groove of the rotor and means is further provided, operative upon rotary motion of the rotor, for effecting the aforesaid relative movement of the disks. Referring to Figure 4, it will be seen that the confronting hubs 59 of the center pair of disks 58, which incidently are capable of sliding motion axially of the shaft 56, are secured together by a push rod 91, engaged in aligned threaded holes formed in the hubs and extending slideably through clearance apertures provided in the hub of an outer disk 58 and in its associated collar 87. Stops 92 pinned to the push rod and disposed on each side of the collar 87 serve to limit reciprocations of the center disks along the shaft 56. The extreme outer end of the push rod 91 bears against an annular cam, best shown in Figures 7 and 8, provided with alternate depressions 93 and protuberances 94, and a coil spring 95, interposed between the disk hub carrying the inner end of the push rod and the confronting face of the adjacent disk hub, serves to maintain pressure of the push rod against the cam. The cam may be mounted on any convenient fixed member such as the bearing 57. As the shaft 56 is rotated, the end of the push rod 91 is caused to traverse the successive depressions 93 and protuberances 94 of the cam thus urging the center disks of the rotor through repeated cycles of motion axially of the shaft, the spring 95 functioning to effect recovery movement of the disks during one-half of each operating cycle. The purpose for moving the center disks is to effect a plurality of rapidly successive contractions and expansions of the rotor grooves during each revolution thereof and, consequently, to cause like variations in the size of the apertures 64. Thus, not only is the range of nut sizes which the rotor unit is capable of operating upon extended above and below a normal predetermined size, but a crushing pressure which is angularly related to the radial crushing pressure imposed on the nuts by the rotors is obtained. This secondary pressure since it is imposed in a direction paralleling the shaft 56 may be aptly termed "axial stress" as distinguished from the "radial stress" mentioned above.

In the preceding description it has been shown how the nuts are fed into the uppermost cracker unit and how the shells of selected nuts are ruptured. After being operated upon by the rotors of the said uppermost unit the discharge from the unit through the opening 54 will consist of large or smaller particles of nut meat, crushed shells and whole nuts which are sufficiently small as to pass the rotors without being acted thereon. Means is provided for separating the ruptured nuts from the whole ones and for conveying the latter toward and into the next succeeding cracker unit. Located below the discharge openings 54 of the upper and intermediate cracker units, is a combined screen, shell remover and conveyor comprising a plurality of spaced elongated rollers 96, which are spaced apart, as is shown in Figure 3, so as to provide slots 97 between adjacent pairs of the rollers, and which are journaled in bearings 98 mounted on the framework 9. Each of the rollers of a set are connected together for synchronous rotation by suitable means, such as the gears 99 of Figure 3, and one roller of each set is provided with a grooved pulley 101 which is engaged by a belt 102 operating from a pulley 103 carried by a shaft 104 suitably journaled in an elevated position on the framework. Bevel gearing 106 connects the shaft 104 to be powered from a jackshaft 107 which in turn is connected for rotation with the shaft 68 by means of pulleys 108 and a belt 109. Each set of rollers 96 is angularly inclined from a position just below the discharge opening 54 of the upper cracker unit toward a position over the hopper 51 of the next lower cracker unit. As the aforesaid flow of whole nuts, nut meats and shell particles emerges from the discharge opening 54 of the uppermost cracker unit, it will fall onto the subtendent rollers 96. The shell and meat particles which are small enough will immediately drop through the slots 97 and will be guided by the inclined wall 111 downwardly and onto a collector or belt 112, positioned below the lowermost cracker unit, which carries the material in a path traversing and below the suction hood 113 of a blower 114 which serves to separate the shell particles and other inedible fibrous material from the nut meat, the latter then passing along the belt toward a sorting or packing table not shown. The belt 112 which is mounted on pulleys 116 journaled in bearings 117, may be powered by any suitable drive means such as a chain 118.

In the flow of material from the uppermost cracker unit there may be, in addition to the uncracked smaller size nuts, a certain quantity of nuts whose shells have been ruptured yet which are too large to pass freely through the slots 97 between the rollers 96. The action of the rotating rollers on nuts in this condition is to tend to draw the nut into the grooves thereby effecting a squeezing which loosens and separates any cracked shell still clinging to the nut meat and, usually, to break the whole nut meat into two halves thus releasing the fibrous membrane present between the halves. The material may then fall through the slots 97 and pass downwardly to the conveyer belt 112. The uncracked nuts which were too small to be acted upon by the previous rotors will roll along in the grooves formed by adjacent pairs of rollers, the rolling being effected partially by gravity and partially as a result of the roller rotation, and will finally pass from the lower end of the roller unit and fall into the hopper of the next lower cracker unit wherein it may or may not be acted upon by the rotors depending upon its size. The spacing between the rollers 96 which provides the slots 97 is sufficiently small that the smallest size of nut normally encountered will not fall through the slots of any of the upper units but will be carried through each cracker unit and along the intervening roller units until it is deposited into the hopper of the final cracker unit, which is designed to receive the smaller sizes of nuts. It will also be noted that the lower end of each roller 96 terminates in a shaft of materially reduced diameter. This provides a pronounced widening of the slots immediately above the hoppers 51 so as to provide free passage for the nuts dropping into the hoppers.

The foregoing description of the apparatus of my invention covers the complete series of operations occuring from the time that the nuts are deposited in the receiving hopper 12 until the meats are passed from the apparatus on the conveyer belt 112. It will be seen that from the start of the process to the completion thereof the nuts are handled in a gentle manner which is highly conducive to the production of a maximum percentage of commercially desirable nut meat halves, and the likelihood of shell splinters and for other fibrous waste being forcibly embedded in the meats is reduced to an absolute minimum. The main reason for this lies in the particular construction of rotors employed for cracking the shells, the resilient fingers with which the rotors are equipped serving to efficiently crack but not shatter the shell and the addition of a secondary side or axial pressure serving to further enhance the shell cracking action.

I claim:

1. In apparatus of the character described, a cracking unit having therein charging and discharge openings through which a flow of nuts may be passed, respectively, into and from the cracking unit, means in said cracking unit and interposed in the path of flow of nuts therethrough for selecting certain of the nuts from said flow and for rupturing said nuts while rejecting other of the nuts, said selecting and rupturing means comprising four relatively flexible rotating elements, means to rotate said elements in directions substantially paralleling said flow of nuts and providing at the peripheries thereof and within the path of said flow an aperture of substantially circular cross-section through which said nuts may pass, and means for reciprocating at least two of said elements axially relative to each other so as to periodically vary the size of said aperture.

2. In apparatus of the character described, a cracking unit having therein charging and discharge openings through which a flow of nuts may be passed respectively into and from the cracking unit, a pair of substantially parallel spaced shafts mounted for rotary movement in said cracking unit, each of said shafts having thereon a rotor comprising at least a pair of axially spaced disks each of said disks being provided with integral spaced portions partially sheared from the body of the disk and arcuately shaped to form, in conjunction with the similar partially sheared portions of the other axially confronting disk, a peripheral groove in the rotor of substantially semi-circular form, the peripheral grooves of the respective rotors being in registry transaxially and cooperating, in the plane of tangency of the rotors, to form a substantially circular aperture disposed in the path of flow of said nuts and through which successive nuts in said flow may be passed, means for imparting rotary movement to said shafts, and means for varying the positions of the respective disks relative to each other for varying the size of said aperture.

3. In apparatus of the character described, a cracking unit having therein charging and discharge openings through which a flow of nuts may be passed respectively into and from the cracking unit, a pair of substantially parallel spaced shafts mounted for rotary movement in said cracking unit, each of said shafts having thereon a rotor comprising at least a pair of axially spaced disks each of said disks being provided with integral spaced portions partially sheared from the body of the disk and arcuately shaped to form, in conjunction with the similar partially sheared portions of the other axially confronting disk, a peripheral groove in the rotor of substantially semi-circular form, the peripheral grooves of the respective rotors being in registry transaxially and cooperating, in the plane of tangency of the rotors, to form a substantially circular aperture disposed in the path of flow of said nuts and through which successive nuts in said flow may be passed, at least one disk on each rotor being fixed against movement axially of the shaft and another disk on each shaft being movable axially of the shaft, means for imparting rotary movement to said shafts, and means for moving said movable disk successively, toward and from said fixed disk.

4. In apparatus of the character described, a cracking unit having therein charging and discharge openings through which a flow of nuts may be passed respectively into and from said cracking unit, bearings mounted in said cracking unit, a pair of substantially parallel spaced shafts journaled in said bearings, each of said shafts having thereon a rotor comprising at least a pair of axially spaced disks, each of said disks having integral spaced portions thereof partially sheared therefrom and arcuately shaped to form, in conjunction with similar partially sheared portions of the other axially confronting disk, a peripheral groove in the rotor of substantially semi-circular cross-sectional form, the peripheral grooves of the respective rotors being in co-planar registry transaxially of the rotors and cooperating, in the plane of tangency of the rotors, to form a substantially circular aperture disposed in the path of flow of said nuts and through which successive nuts in said flow may be passed, one of said disks being fixed against movement axially of said shaft and another of said disks confronting the fixed disk being shiftable axially of the shaft, a cam carried by one of said bearings concentric with said shaft and having thereon undulations and depressions paralleling the axis of the shaft, means for imparting rotary movement to said shafts, and a push rod engaged respectively with said shiftable disk and said cam for shifting the latter disk on the shaft during rotary movement of the shaft.

FREDERICK M. BALDWIN.

REFERENCES CITED

The following references are of record in the file of this patent:

UNITED STATES PATENTS

| Number | Name | Date |
| --- | --- | --- |
| 1,260,203 | Kammerdiener | Mar. 19, 1918 |
| 1,282,408 | Gaylord et al. | Oct. 22, 1918 |
| 1,388,574 | Kelling | Aug. 23, 1921 |
| 1,469,332 | Gotzheim | Oct. 2, 1923 |
| 1,477,649 | Huston | Dec. 18, 1923 |
| 1,971,170 | Baldwin | Aug. 21, 1934 |
| 2,144,841 | Glaser | Jan. 24, 1939 |
| 2,205,177 | Schlegel | June 18, 1940 |
| 2,220,320 | Dragon | Nov. 5, 1940 |
| 2,319,757 | Vigneau | May 18, 1943 |
| 2,343,270 | Agnew | Mar. 7, 1944 |

FOREIGN PATENTS

| Number | Country | Date |
| --- | --- | --- |
| 417,176 | France | Aug. 23, 1910 |
| 16,829 | Great Britain | July 22, 1913 |